United States Patent [19]

Tanoi

[11] Patent Number: 5,121,202
[45] Date of Patent: Jun. 9, 1992

[54] ADAPTIVE INTERFRAME PREDICTION CODED VIDEO COMMUNICATIONS SYSTEM

[75] Inventor: Toshiyuki Tanoi, Tokyo, Japan
[73] Assignee: NEC Corporation, Japan
[21] Appl. No.: 522,538
[22] Filed: May 11, 1990

[30] Foreign Application Priority Data

May 12, 1989 [JP] Japan ............................. 1-117242
Jun. 2, 1989 [JP] Japan ............................. 1-139224

[51] Int. Cl.⁵ .................. H04N 7/12; H04N 11/06
[52] U.S. Cl. .................................. 358/136; 358/133; 358/135; 358/12
[58] Field of Search ............... 358/133, 135, 136, 141, 358/11, 12

[56] References Cited

U.S. PATENT DOCUMENTS

| | | | |
|---|---|---|---|
| 4,460,923 | 7/1984 | Hireno | 358/136 |
| 4,562,468 | 12/1985 | Koga | 358/136 |
| 4,723,161 | 2/1988 | Koga | 358/136 |
| 4,733,298 | 3/1988 | Kaga | 358/136 |
| 4,954,892 | 9/1990 | Asai et al. | 358/136 |
| 4,958,226 | 9/1990 | Haskell et al. | 358/136 |
| 4,972,260 | 11/1990 | Fujikawa et al. | 358/135 |
| 4,999,705 | 3/1991 | Pieri | 358/136 |

OTHER PUBLICATIONS

Links for the Future, IEEE International Conference on Communications, May 14–17, 1984, Proceedings, vol. 2 (pp. 707–710), by P. Dewilde and C. A. May.

Primary Examiner—John K. Peng
Attorney, Agent, or Firm—Ostrolenk, Faber, Gerb & Soffen

[57] ABSTRACT

At the transmit end of a video communications system, a first motion vector is derived from successive frames during a frame transmit mode and a second motion vector is derived during or immediately following a frame discard mode. An interframe predicted error signal is generated which is representative of the difference between each input frame and a motion-compensated, previous frame during the frame transmit mode, the difference being zero during the frame discard mode. The predicted error signal and the vectors are transmitted to the receive end of the system. In a first embodiment, the second motion vector is derived at the transmit end from frames spaced apart by a discarded frame, and at the receive end, original frames are recovered from the predicted error signal as well as from the first and second motion vectors, and the second motion vector is down-scaled and evaluated whether it is valid or not. During frame discard mode, motion compensation is performed on the recovered frame using the down-scaled vector in response to a valid evaluation, but no compensation is performed if invalid evaluation is made. In a second embodiment, the second motion vector is derived at the transmit end from successive frames using a larger block size than that used in the first motion vector. At the receive end, the first motion vector as well as the error signal are used in recovering original frames. During the frame discard mode, the second vector is simply used for motion compensation.

27 Claims, 8 Drawing Sheets

ADAPTIVE INTERFRAME PREDICTION CODED VIDEO COMMUNICATIONS SYSTEM

BACKGROUND OF THE INVENTION

The present invention relates generally to video communications system, and more specifically to a video communications system in which motion-compensated interframe prediction coding and decoding principles are employed to reduce the rate of transmitted signals.

In a video communications system, a technique known as interframe predicting coding at the transmit end is employed to discard frames in order to set an upper limit on the transmission bit rate which would otherwise exceed that limit as a result of rapidly moving images. At the receive end of the system, discarded frames are created by repeatedly displaying a previous frame. The shortcoming of this technique is that jerkiness arises due to the repetition of same frames.

An interpolation technique is described in "Motion-Adaptive Interpolation For Videoconference Pictures", A. Furukawa et al., ICC '84, Links for The Future, Science, Systems & Services for Communications, IEEE International Conference on Communications, May 14–17, 1984 RAI Congress Centre, Amsterdam, The Netherlands, Proceedings, Volume 2, pages 707 to 710. According to this technique, an interframe predicted error signal and a motion vector are transmitted to a receive end where a representative vector is derived from the transmitted vectors and used for motion-compensating for a repeated frame to eliminate jerkiness.

SUMMARY OF THE INVENTION

It is therefore an object of the present invention to provide interframe prediction coding and decoding technique for video communications that is less liable to jerkiness.

At the transmit end of a video communications system of the present invention, a first motion vector is derived from successive frames during a frame transmit mode and a second motion vector is derived during or immediately following a frame discard mode. An interframe predicted error signal is generated which is representative of the difference between each input frame and a motion-compensated, previous frame during the frame transmit mode, the difference being zero during the frame discard mode. The predicted error signal and the vectors are transmitted to the receive end of the system.

According to a first aspect of this invention, the second motion vector is derived at the transmit end from frames spaced apart by a discarded frame, and at the receive end, original frames are recovered from the predicted error signal as well as from the first and second motion vectors, and the second motion vector is down-scaled and evaluated whether it is valid or not. During frame discard mode, motion compensation is performed on the received frame using the down-scaled vector in response to a valid evaluation, but no compensation is performed if invalid evaluation is made.

According to a second aspect, the second motion vector is derived at the transmit end from successive frames using a larger block size than that used in the first motion vector. At the receive end, the first motion vector as well as the error signal are used in recovering original frames. During the frame discard mode, the second vector is simply used for motion compensation.

More specifically, the first aspect of the present invention provides a digital video communications system operating in a frame transmit mode or a frame discard mode depending on a rate of signals being transmitted. The system includes a motion vector detector operable during the frame transmit mode for deriving a first motion vector from a current input frame and a previous frame and a second motion vector from frames spaced apart by an intermediate frame which was discarded during the frame discard mode. A coding circuit locally recovers a previous input frame during the frame transmit mode, repeats the recovered frame during the frame discard mode, motion-compensates for the locally recovered frame with both first and second motion vectors, and generates an interframe predicted error signal containing an initial frame followed by a differential signal which is representative of the difference between the current input frame and the motion-compensated frame during the frame transmit mode and is representative of a zero difference during the frame discard mode. The predicted error signal and the first and second motion vectors are transmitted through a transmission medium and received at the receive end of the system, where original frames are recovered from the received predicted error signal as well as from both first and second motion vectors, and the received second motion vector is down-scaled. A decision circuit is provided for making a first or second decision if the received second motion vector is valid or invalid, respectively, for motion compensation to be effected during the frame discard mode. A variable delay circuit is coupled to the decoding circuit to introduce no delays to frames recovered by the decoding circuit during the frame transmit mode, and is responsive to the first decision to introduce a delay corresponding to the down-scaled motion vector to a frame recovered during the frame discard mode. In response to the second decision, the variable delay circuit introduced no delay to the frame recovered during the frame discard mode.

According to the second aspect, a first motion vector detector is provided for performing block matching between successive input frames with a smaller block size during the frame transmit mode to produce a first motion vector, and a second motion vector detector is provided for performing block matching between successive input frames with a larger block size during the frame discard mode and producing a second motion vector. A coding circuit locally recovers a previous input frame during the frame transmit mode, repeats the recovered frame during the frame discard mode, motion-compensates for the locally recovered frame with the first motion vector, and generates an interframe predicted error signal containing an initial frame followed by a differential signal which is representative of the difference between the current input frame and the motion-compensated frame during the frame transmit mode and is representative of a zero difference during the frame discard mode. At the receive end, original frames are recovered from the received predicted error signal as well as from the received first motion vector. A variable delay circuit is coupled to the decoding circuit to introduce no delays to frames recovered during the frame transmit mode and introduce a delay corresponding to the received second motion vector to a frame recovered during the frame discard mode.

BRIEF DESCRIPTION OF THE DRAWINGS

The present invention will be described in further detail with reference to the accompanying drawings, in which.

DETAILED DESCRIPTION

Figure 1:
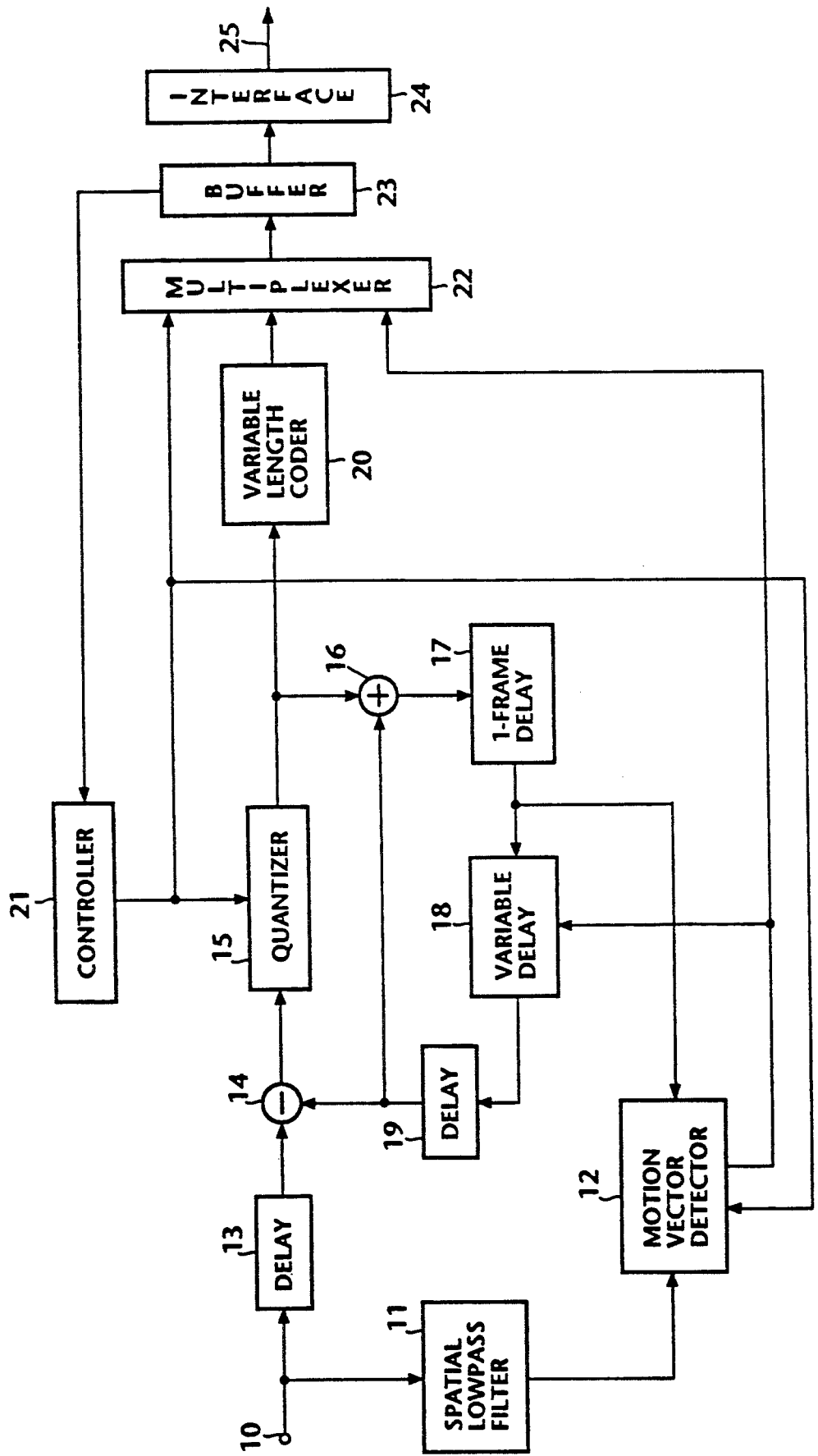
FIG. 1 is a block diagram of an interframe prediction coder according to an embodiment of the present invention.

Referring now to FIG. 1, there is shown a motion-compensated adaptive interframe prediction coder according to an embodiment of the present invention. Digitized (PCM) video signal appearing at input terminal 10 is passed through a spatial lowpass filter 11 to a motion vector detector 12, and further applied through a delay circuit 13 to a first input of a subtractor 14 which forms part of an interframe prediction coding loop. The output of subtractor 14 is quantized by a quantizer 15 and fed to one input of an adder 16 as well as to a variable length encoder 20. The output of adder 16 is delayed for a frame interval by a one-frame memory, or delay circuit 17 and fed to a variable delay circuit 18 whose delay time is controlled by the output of motion vector detector 12. The output of variable delay circuit 18 is passed through a delay circuit 19 to a second input of subtractor 14 where it is subtracted from the output of delay circuit 13, and further applied to the second input of adder 16. The amounts of delay circuits 13 and 19 are appropriately adjusted so that the current frame appearing at the first input of subtractor 14 is coincident with a previous frame appearing at the second input.

Motion vector detector 12 is of a known design which receives the output of frame delay circuit 17 as its second input signal to detect a motion vector V on a block-by-block basis in a manner known as "block matching method." Namely, a block of pixel intensities in a given frame is matched to a block in a subsequent frame by searching for the displacement, or "motion vector" which produces the "best match" in which the sum of absolute values of interframe differences is at a minimum.

A controller 21 provides control on the quantizer 15 in accordance with the storage level of a transmit buffer 23. When the amount of data stored in buffer 23 is lower than a prescribed storage level, controller 21 produces a logic-1 signal which enables the quantizer 15 to quantize its input signal into quantization levels appropriate for transmission. If it exceeds the prescribed level, controller 21 produces a logic-0 signal to hold the output of quantizer 15 to a logic-0 level for discarding a frame to prevent buffer 23 from being overloaded. Motion vector detector 12 effects the motion vector detection when the output of controller 21 is at logic 1 and is disabled when it is at logic 0, producing a zero vector output. Spatial lowpass filter 11 has the effect of allowing motion vector detector 12 to produce precise motion vectors.

A time division multiplexer 22 combines the outputs of variable length encoder 20, motion vector detector 12 and controller 21 into a single data bit stream for coupling to transmit buffer 23 whose output is coupled through a line interface 24 to a transmission line 25.

Figure 3:
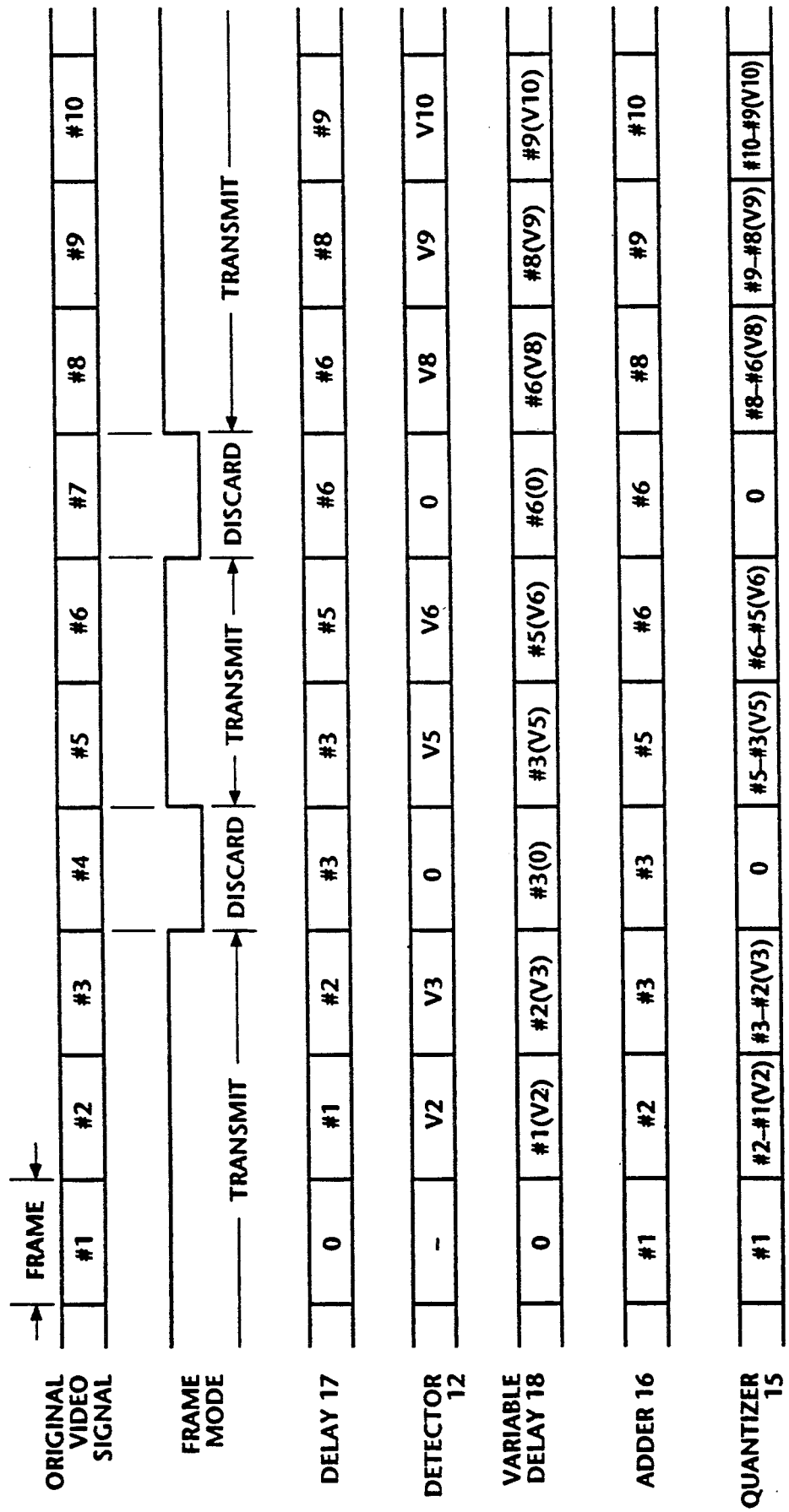
FIGS. 3 and 4 are timing diagrams associated respectively with the coder and decoder of FIGS. 1 and 2.

The operation of the coding circuit of FIG. 1 is visualized with reference to FIG. 3. Assume that transmit buffer 23 is initially cleared and its storage level is lower than the prescribed value during frame periods other than #4 and #7. Controller 21 produces a logic-1 output during these frame periods.

When #1-frame digital video signal is fed to the first input of motion vector detector 12 through input terminal 10, there is no video signal at the second input of motion vector 12 from one-frame delay circuit 17 and therefore it produces no vector output. Therefore, during #1 frame period, no video signal appears at the output of variable delay circuit 18 and the frame #1 appears at the output of subtractor 14 as well as at the output of adder 16. During #2 frame period, frame #1 reappears at the output of one-frame delay circuit 17 and a frame #2 appears at the input terminal 10. Motion vector detector 12 produces a motion vector V2 by performing a block matching between the incoming #2 frame and the previous frame #1. In accordance with the motion vector V2, variable delay circuit 18 introduces a delay time to the #1-frame video signal, producing a motion-compensated video signal #1(V2) as indicated in FIG. 3. As a result, a difference signal of magnitude #2-#1(V2) is encoded by quantizer 15 for transmission, and a locally recovered frame #2 is generated at the output of adder 16 to be used during #3 frame period. Similar operations continue as long as the storage level of buffer 23 is lower than the prescribed value, so that during #3 frame period, a difference signal of magnitude #3-#2(V3) is encoded for transmission and a replica of frame #3 is locally recovered at the output of adder 16 to be used during the next frame period.

When buffer 23 reaches its prescribed storage level during #4 frame period, controller 21 switches its output to a logic-0 level to discard frame #4. In response to this logic-0 output, motion vector detector 12 generates a 0 vector output and quantizer 15 produces a logic-0 output. Variable delay circuit 18 allows frame #3 to pass therethrough with no delays to subtractor 14 as well as to adder 16. Therefore, frame #3 will appear again at the output of one-frame delay circuit 17 during #5 frame period. In this way, motion-compensated difference video signals (interframe predicted errors) are generated when frames are not discarded and no signals are transmitted when frames are discarded. It is seen from FIG. 3 that each of motion vectors V2, V3, V6, V9 and V10 is derived from consecutive frames, whereas motion vectors V5 and V8 are each derived from two frames spaced apart by an intermediate frame which was discarded. The output of variable length encoder 20 represents an interframe predicted error and the output of controller 21 represents a frame mode signal which at one of two logic levels as described above. These signals are multiplexed with the motion vector signal into a single data bit stream for transmission.

Figure 2:
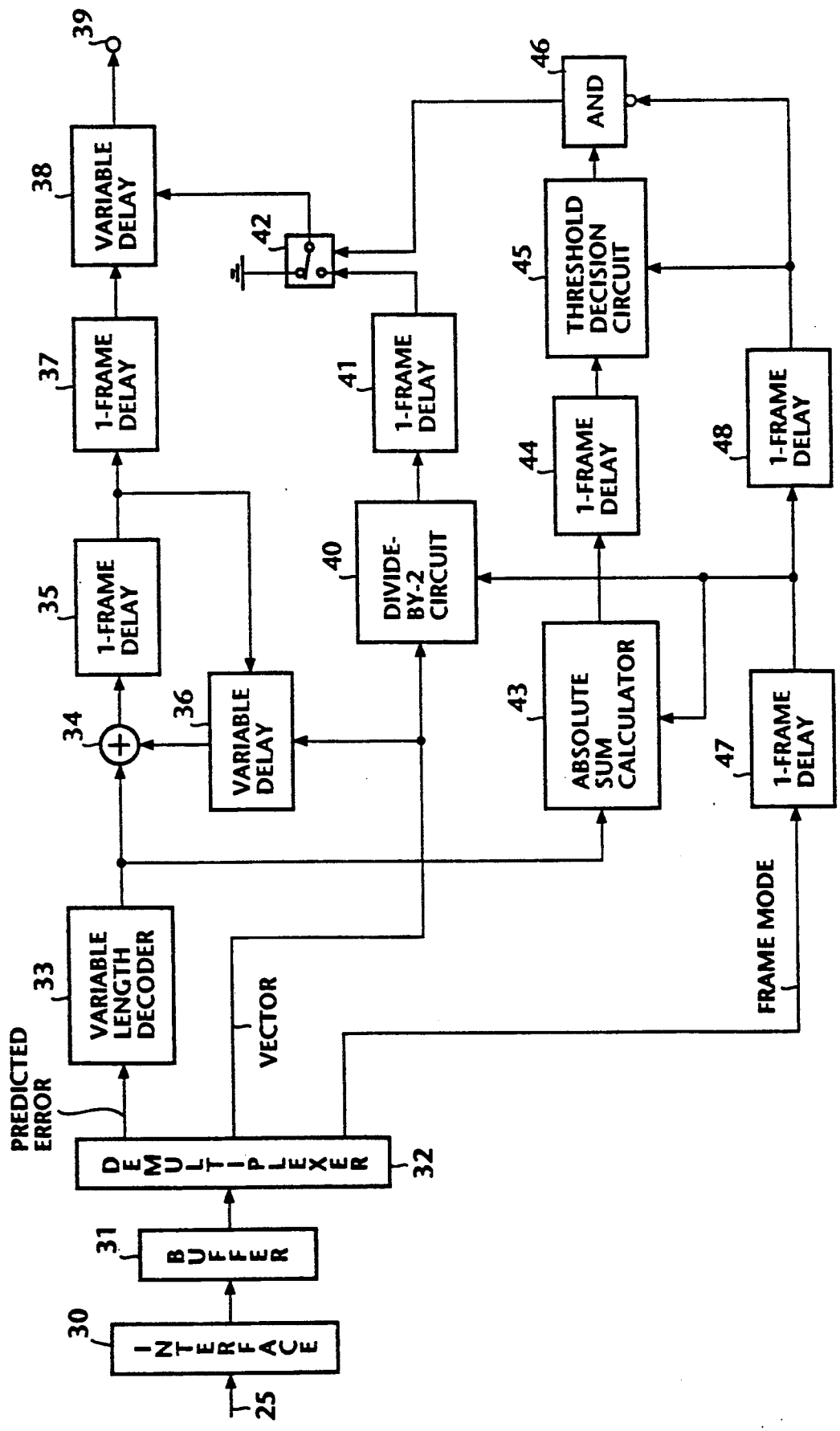
FIG. 2 is a block diagram of an interframe prediction decoder associated with the prediction coder of FIG. 1.

In FIG. 2, there is shown a motion-compensated prediction decoder according to the first embodiment of the present invention. The decoder comprises a line interface unit 30 interfacing the decoder to transmission line 25. Signals transmitted from the prediction coder are temporarily stored into a receive buffer 31 before being fed to a time-division demultiplexer 32 where the incoming data bit stream is decomposed into the predicted error signal for coupling to a variable length decoder 33, the motion vector signal for coupling to a divide-by-2 circuit 40 and the frame mode signal for coupling to a one-frame delay circuit 47 to the output of which another one-frame delay circuit 48 is connected. The series connection of delay circuits 47 and 48 produces a logic 0 at the negative input of an AND gate 46 at time which is delayed by two frame periods following the occurrence of a frame which was discarded.

The output of decoder 33 is fed to one input of an adder 34 the output of which is coupled to a one-frame delay circuit 35. A variable delay circuit 36 is connected to the output of delay 35 to form a frame recovery loop by coupling to the second input of adder 34 a version of a frame which is motion-compensated for with the horizontal and vertical (X-Y) components of a demultiplexed motion vector. The output of one-frame delay 35 is fed to another one-frame delay circuit 37 and thence to a variable delay circuit 36 which is responsive to the output of a switch 42.

Divide-by-2 circuit 40 halves the horizontal and vertical components of motion vector in response to a logic-0 output from delay circuit 47 and supplies an output vector to a one-frame delay circuit 41 which is in turn coupled to switch 42.

The output of decoder 33 is further applied to an absolute sum calculator 43. This calculator is enabled in response to the logic-0 output of one-frame delay 47 to provide a sum of the absolute values of the predicted errors of the frame period that immediately follows a discarded frame on a block-by-block basis. The output of calculator 43 is stored for a frame duration in a delay circuit 44. A threshold decision circuit 45 is connected to the output of delay 44 to determine whether a motion vector which was received on a previous frame has an acceptable level of precision. This determination is made in response to the logic-0 output of delay 48 by comparing the calculated sum with a prescribed decision threshold and supplies a logic 0 to one input of AND gate 46 when the sum is higher than the decision threshold or a logic 1 when the sum exceeds the decision threshold. The logic-0 output of threshold decision circuit 45 indicates that the motion vector is not sufficiently precise to be used by variable delay 38 to provide motion-compensation. Therefore, under such conditions, the motion vector is not used, and a previous frame is simply repeated. The logic-1 output of the decision circuit, on the other hand, indicates that the motion vector is sufficiently precise for such purposes and is supplied to variable delay 38 via switch 42 following a one-frame delay period to motion-compensate for a frame which was repeated as an interpolation of a discarded frame.

The output of AND gate 46 is used to control the switch 42. In the presence of a logic-0 input from AND gate 46, switch 42 applies a logic 0 to variable delay circuit 38 to allow it to pass the output of one-frame delay 37 without delays to an output terminal 39. In response to a logic 1 from AND gate 46, switch 42 couples the one-frame delayed output of divide-by-2 circuit 40 to variable delay 38 to cause it to motion-compensate for the output of delay 37. This is accomplished by delaying the input from delay circuit 37 by an amount corresponding to one-halves of the horizontal and vertical components of a motion vector such as V5 and V8 which was derived from two frames between which the intermediate frame was discarded.

Figure 4:
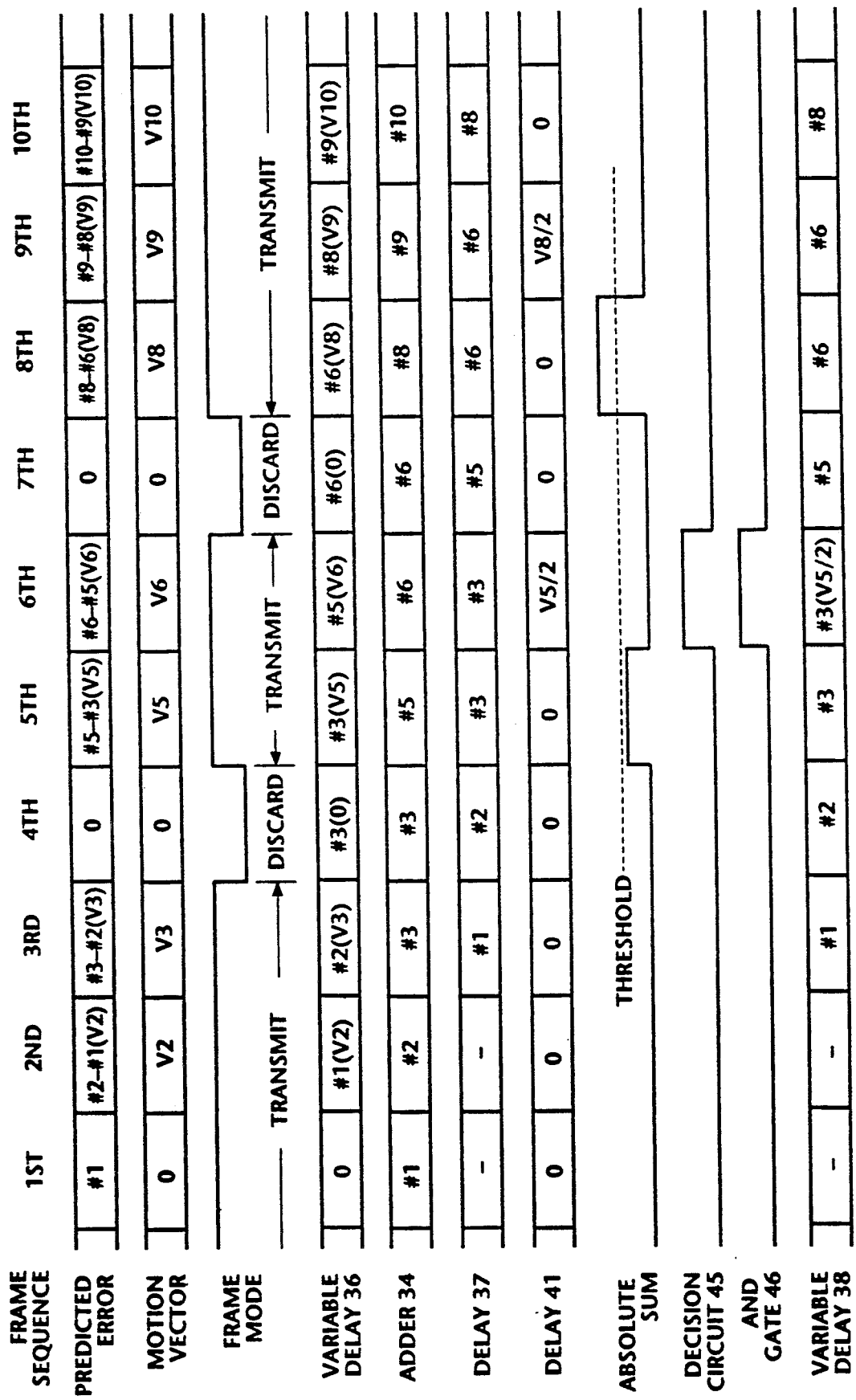

The operation of the decoder of FIG. 2 is best understood with reference to FIG. 4. During the first frame period, the #1-frame video signal is recovered by decoder 33 and is passed through adder 34 to delay circuit 35.

During the second frame period, the frame #1 is entered to delay 37 and the next frame, which is the predicted error represented by #2−#1(V2), is supplied to adder 34. Motion vector V2 is also applied to the control input of variable delay circuit 36 to motion-compensate for the #1-frame video signal appearing t the output of delay 35 by delaying it by an amount corresponding to the X-Y components of that vector. The output of variable delay 36 si therefore represented by #1(V2) and summed by adder 34 with the current Interframe predicted error which is given by #2-#1(V2), thus recovering a replica of the original frame #2 at the input of delay 35.

During the third frame period, the frame #1 now stored in delay 37 is emptied to variable delay 38. Since the output of AND gate 46 is at logic 0, frame #1 is allowed to appear at the output terminal 39 without delays. The frame #2 now stored in delay 35 is entered to variable delay 36 where it is compensated for with the current motion vector V3 and summed by adder 34 with the current predicted error #3-#2(V3), recovering a replica of the original frame #3 at the input of delay 35.

In a similar manner, frames #2 and #3 appear at the output terminal 39 in succession during the fourth and fifth frame periods, respectively. Since frame #4 was discarded, and hence the predicted error and motion vector are both 0 during the fourth frame period, frame #3 appears again at the output of adder 34.

Assume that the motion vector V5 that is sent during the fifth frame period has an acceptable level of precision for motion compensation while motion vector V8 which will be sent during the seventh frame period is below the acceptable level. Absolute sum calculator 43 responds to a logic-0 output from delay 47 during the fifth frame period to generate an output of amplitude which is below the decision threshold as indicated by a dashed line in FIG. 4.

During the sixth frame period, the output of calculator 43 appears at the input of threshold decision circuit 45 after passing through delay circuit 44. In response to a logic-0 output from delay 48, decision circuit 45 compares the absolute sum with the decision threshold and produces a logic-1 output as indicated in FIG. 4. It is seen that AND gate 46 now produces a logic-1 output at the control input of switch 42 to switch its output to the lower position. The horizontal and vertical components of motion vector V5 were halved during #5 frame period and stored in delay 41. This halved motion vector, represented by V5/2, is now supplied through switch 42 to the control input of variable delay 38 to compensate for the output of delay 37 which corresponds to frame #3 of the second occurrence, recovering a video output represented by #3(V5/2) which appears at the output terminal 39 as a result of "motion-compensated interpolation."

During the seventh frame period, since frame #7 was discarded, frame #6 appears again at the output of adder 34 and stored in one-frame delay 35. Frame #5 is now supplied from delay 37 and passed through variable delay 38 without delays to the output terminal 39 since the output of AND gate 46 is now at logic 0.

During the eighth frame period, a logic-0 output appears at the output delay 47 enabling the calculator 43 and divide-by-2 circuit 40 to carry out their functions, so that a vector V8/2 is stored into one-frame delay 41 to be used in the next frame period. Since the motion vector V7 is assumed to be of inacceptable quality, calculator 43 produces an output that exceeds the decision threshold. Frame #6 stored in delay 37 now appears at the output terminal 39.

During the ninth frame period, decision circuit 45 generates a logic 0 which disables AND gate 46. Thus, the output of AND gate 46 remains at logic 0, and switch 42 continues to supply logic 0 to the control input of variable delay 38 through which frame #6 is passed without delays and appears at the output terminal 39 as a result of "linear interpolation." The repeated appearance of frame #6 before the recovery of frame #8 during the next frame may produce some jerkiness, but it improves the total quality of reconstructed images by preventing the display of frame #6 which would otherwise be deteriorated by the inacceptable motion vector V7.

Figure 5:
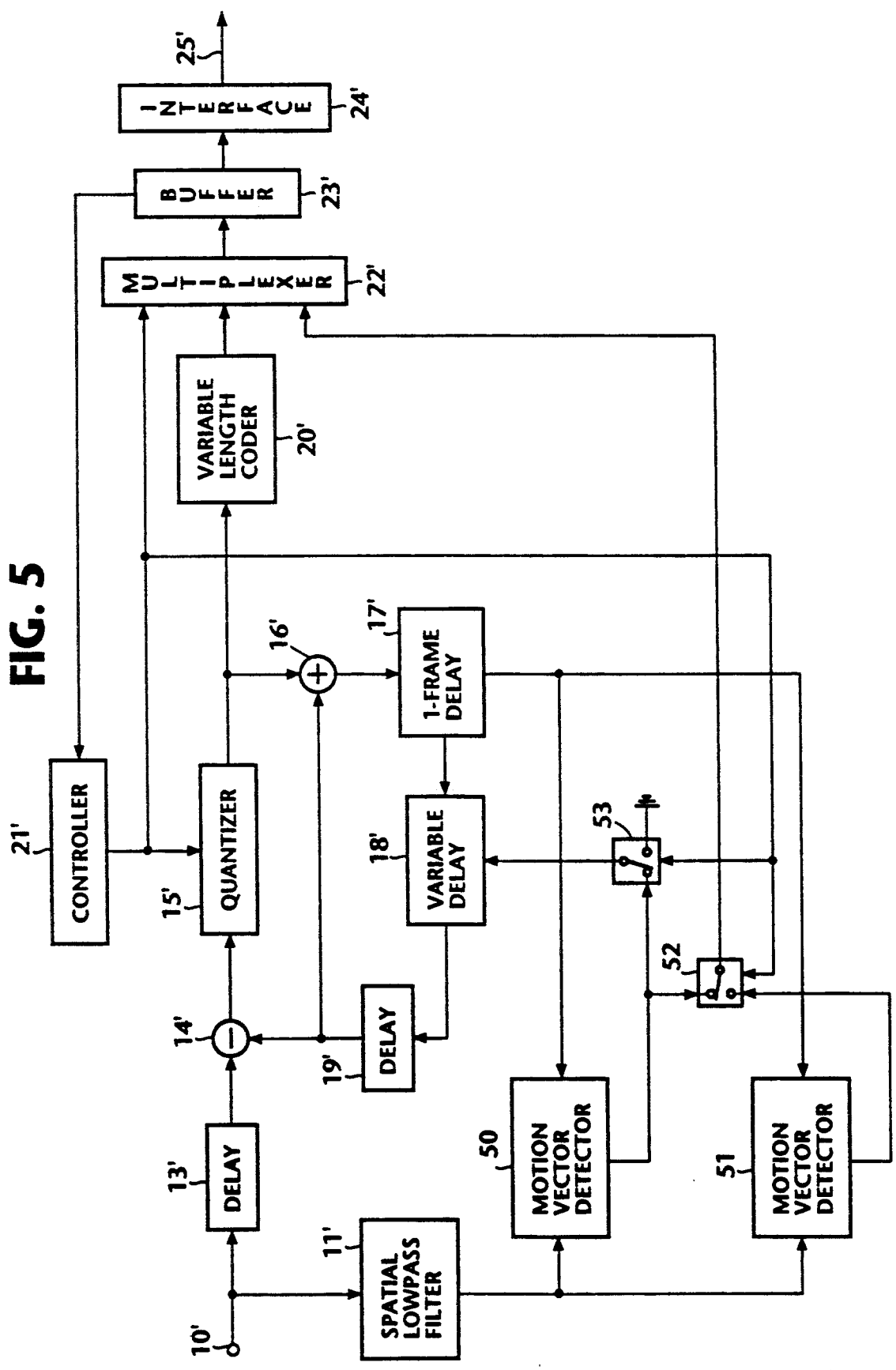
FIG. 5 is a block diagram of an interframe prediction coder according to a modified embodiment of the present invention.
Figure 6:
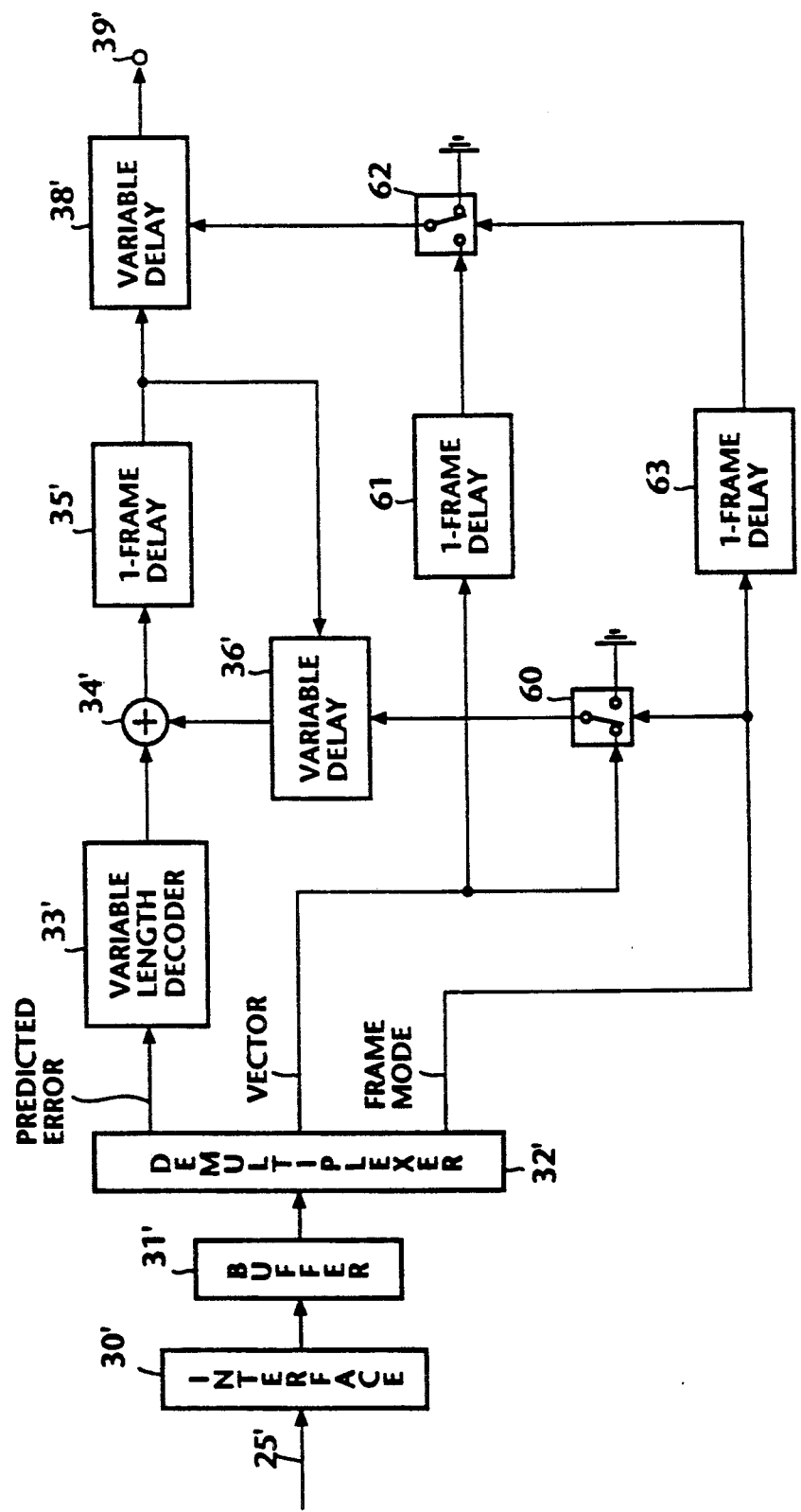
FIG. 6 is a block diagram of an interframe prediction decoder associated with the prediction coder of FIG. 4.

An interframe prediction coder and decoder of a modified embodiment of the present invention are shown in FIGS. 5 and 6, respectively, in which parts corresponding to those in FIGS. 1 and 2 are marked with the same but primed numerals, the description of these corresponding parts being omitted for conciseness.

In FIG. 5, the modified prediction coder differs from the previous embodiment in that it includes two motion vector detectors 50 and 51 and switches 52 and 53. Motion vector detector 50 provides block matching using a smaller block size when frames are encoded for transmission, while motion vector detector 51 provides block matching with a larger block size when a frame is discarded. The use of smaller block size has the effect of producing vectors which limit the power level of predicted errors to a suitable level which would otherwise be exceeded, while the use of larger block size has the effect of generating more accurate vectors during frame discard modes than those produced with the use of smaller block size to permit the prediction decoder to perform precise motion-compensated interpolation.

The outputs of motion vector detectors 50 and 51 are selectively coupled by switch 52 to multiplexer 22' for transmission in response to the output of controller 21'. Switch 53 is also responsive to the controller output to selectively apply the output of detector 50 and ground potential (or logic 0) to the control terminal of variable delay circuit 18'. When the output of controller 21' is at logic 1, switch 52 is in the upper position and switch 53 is in the left position, coupling the output of motion vector detector 50 to variable delay 18' as well as to multiplexer 22'. When the controller output is at logic 0, switch 52 is in the lower position to apply the output of detector 51 to multiplexer 22' and switch 53 is in the right position to supply a logic 0 to variable delay 18'.

Figure 7:
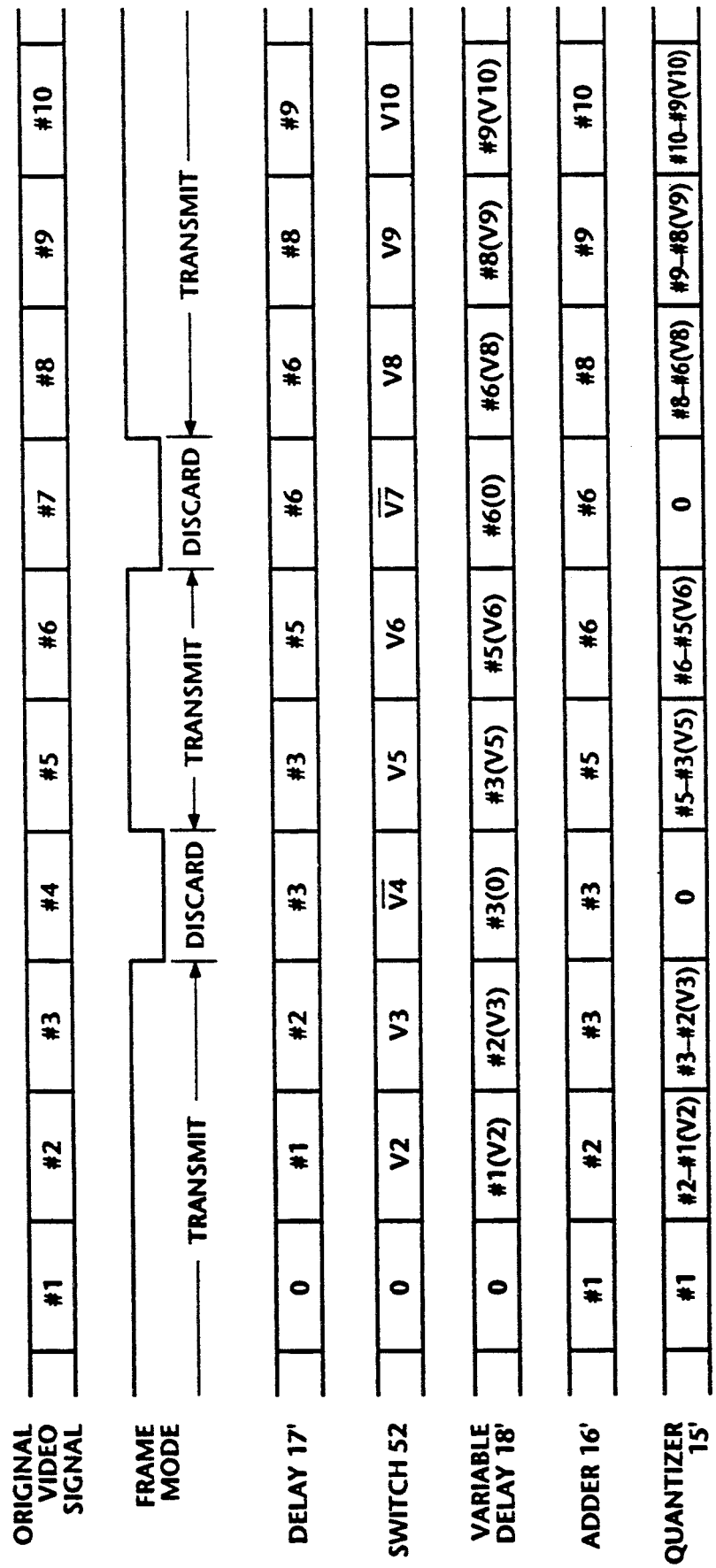
FIGS. 7 and 8 are timing diagrams associated respectively with the coder and decoder of FIGS. 5 and 6.

A timing diagram of the coder of FIG. 5 is shown in FIG. 7. During the first to third frame periods, the output of controller 21' is at logic 1 so that switches 52 and 53 are in the upper and left positions, respectively. Motion vectors 0, V2 and V3 are successively generated by vector detector 50 for transmission to the prediction decoder of FIG. 6 and variable delay 18' is controlled with such vectors to produce a frame #1 followed by predicted errors #2-#1(V2) and #3-#2(V3) at the output of quantizer 15'. Events similar to those of the second and third frame periods occur during other frame transmit mods, i.e., the fifth, sixth, eighth, ninth and tenth frame periods.

During the fourth frame period in which frame #4 is discarded, the controller output is at logic 0, operating the switches 52 and 53 to the lower and right positions, respectively. Motion vector detector 51 performs block matching between the frame #3 supplied from delay 17' and the current frame #4 using a larger block size to produce a vector $\overline{V4}$, which is fed to the multiplexer 22' and transmitted. Variable delay 18' is supplied with a logic-0 (zero-delay) control input to produce a zero predicted error output for transmission. Similar events occur during the seventh frame period in which motion vector $\overline{V7}$, is derived from frames #6 and #7 and transmitted.

It is seen from FIG. 7 that the operation of the modified prediction coder differs from the previous embodiment in that vectors derived with the use of the larger block size are transmitted instead of the zero vectors of the FIG. 1 embodiment.

In the modified prediction decoder of FIG. 6, the demultiplexer vector is applied to the left position of a switch 60 on the one hand and applied further via a one-frame delay circuit 61 to the left position of a switch 62 on the other. The right positions of switches 60 and 62 are grounded to supply a logic 0 and their output terminals are respectively coupled to variable delay circuits 36' and 64. The demultiplexed frame mode signal is used as a switching control signal and applied direct to switch 60 and via a one-frame delay circuit 63 to switch 62. At logic 1, the frame mode signal causes switch 60 to move to the left position to operate the variable delay circuit 36' with a received vector and causes switch 62, after a frame-period delay, to move to the right position to supply a logic 0 to a variable delay circuit 39' which is connected to the output of delay 35'. In response to the logic 0, the output of delay 35' is passed through variable delay 38' without delays to output terminal 39'. When the frame mode signal is at logic 0, switch 60 is moved to the right position to allow the output of delay 35' to be passed through variable delay 36' to adder 34' without delays. Concurrently, switch 62 is moved to the right position to couple the output of one-frame delay 61 to variable delay 38' to cause it to perform motion-compensation on the output of delay 35' using a vector that is received during frame discard mode.

Figure 8:
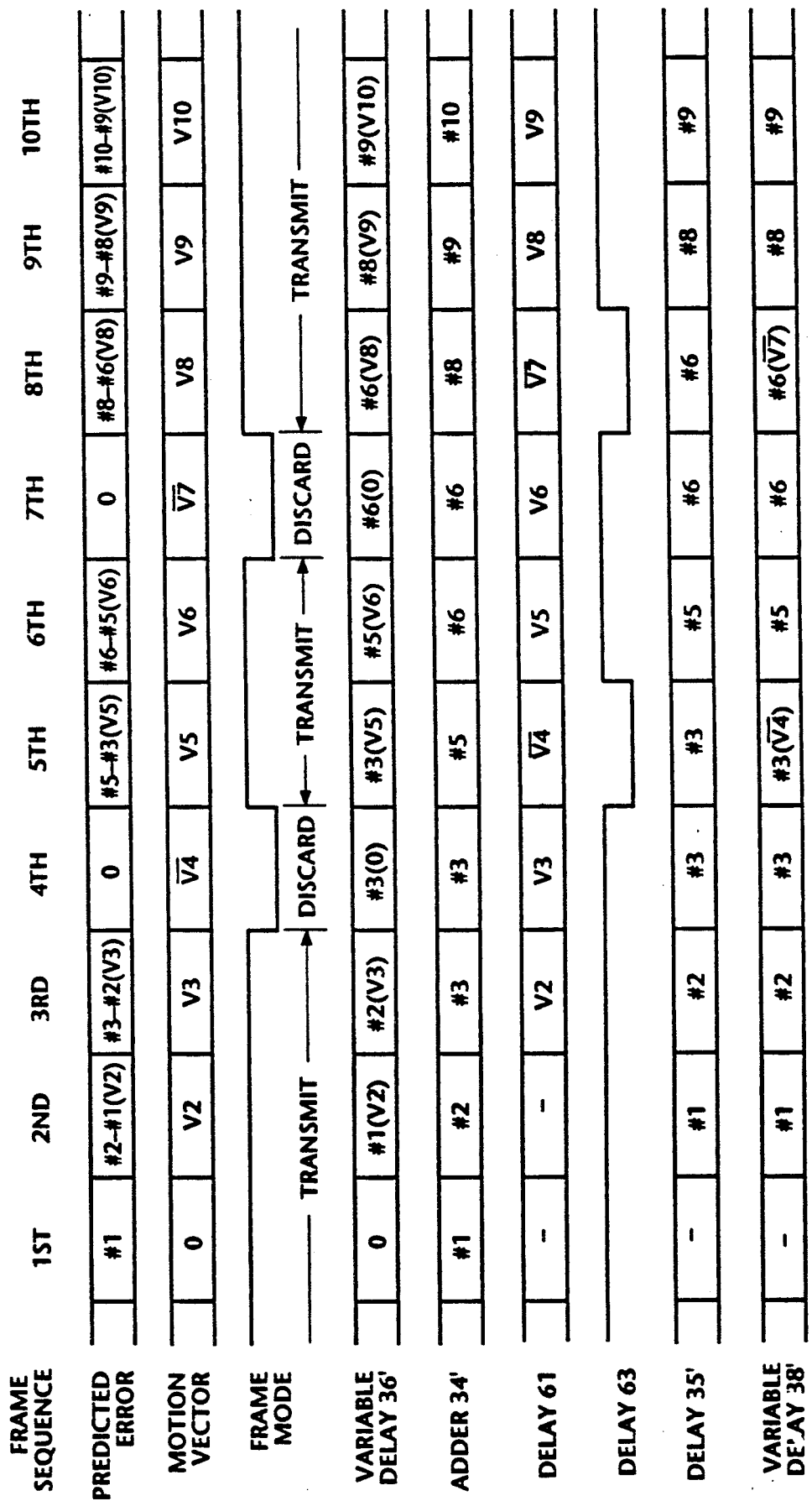

The operation of the decoder of FIG. 6 will be understood with reference to FIG. 8. During the first to third frame periods (frame transmit modes), motion vectors 0, V2 and V3 are received successively and one-frame delayed versions of frame #1 and following predicted errors are successively motion-compensated for with the vectors and summed with later incoming signals by the frame recovery loop consisting of adder 34', one-frame delay 35' and variable delay 36', so that during the first and second frame periods frames #1 and #2 are recovered at the output of variable delay 38' which is now operating with a zero-delay control input from switch 62.

During the fourth frame period (frame discard mode), the predicted error is zero and is summed with a delayed version of frame #3 appearing at the output of delay 36' which is now operating with a zero-delay control input from switch 60, thus recovering frame #3 at the output of delay 38' which is still operating with the zero-delay control input from switch 62. Frame #3 is stored again into delay 35' to be motion-compensated in the next frame period. And switch 62 is moved to the right so that a delayed version of frame #3 is motion-compensated for with vector V5 by variable delay 36' for coupling to adder 34' on the one hand, and is further motion-compensated for with a delayed version of vector $\overline{V4}$ by variable delay 38' generating an output #3($\overline{V4}$), on the other, for delivery to the output terminal 39' as an interpolation of frame #4.

Events similar to those in the third to fifth frame periods occur respectively during the sixth to eighth frame periods, recovering frames #5, #6 and #6($\overline{V7}$) in succession.

The foregoing description shows only preferred embodiments of the present invention. Various modifications are apparent to those skilled in the art without departing from the scope of the present invention which is only limited by the appended claims. Therefore, the embodiments shown and described are only illustrative, no restrictive.

What is claimed is:

1. A digital video communications system which is operable in a frame transmit mode or a frame discard mode depending on a rate of signals being transmitted, comprising:
   a motion vector detector operable during said frame transmit mode for deriving a first motion vector from a current input frame and a previous frame and a second motion vector from frames spaced apart by an intermediate frame which was discarded during said frame discard mode;
   a coding circuit for locally recovering a previous input frame during said frame transmit mode, repeating the recovered frame during said frame discard mode, motion-compensating for the locally recovered frame with said first and second motion vectors, and generating an interframe predicted error signal containing an initial frame followed by a differential signal which is representative of the difference between said current input frame and said motion-compensated frame during said frame transmit mode and is representative of a zero difference during said frame discard mode;
   transmit means for transmitting said predicted error signal and said first and second motion vectors through a transmission medium;
   receive means for receiving said predicted error signal and said first and second motion vectors through said transmission medium;
   a decoding circuit for recovering original frames from the received predicted error signal and the received first and second motion vectors;
   variable delay means coupled to said decoding circuit;
   means for down-scaling the received second motion vector;
   decision means for making a first or second decision if the received second motion vector is valid or invalid, respectively, for motion compensation to be effected during said frame discard mode; and
   means for causing said variable delay means to introduce no delays to frames recovered by said decoding circuit during said frame transmit mode, and responsive to said first decision for causing said variable delay means to introduce a delay corresponding to the down-scaled motion vector to a frame recovered by said decoding circuit during said frame discard mode, and responsive to said second decision for causing said variable delay means to introduce no delay to the frame recovered during said frame discard mode.

2. A digital video communication system as claimed in claim 1, wherein said down-scaling means halves horizontal and vertical components of the received second motion vector.

3. A digital video communications system as claimed in claim 1, wherein said decision means makes said first decision if the predicted error signal which is received immediately following a discarded frame is below a threshold or said second decision if said signal is above said threshold.

4. A digital video communications system as claimed in claim 3, wherein said decision means calculates absolute values of the predicted error signal of a frame period following said discarded frame and gives a sum of said absolute values, and makes said first decision if said sum is below said threshold or said second decision if said sum is above said threshold.

5. A digital video communications system as claimed in claim 1, further comprising spatial lowpass filter means for lowpass-filtering said current frame before being applied to said motion vector detector.

6. A decoding apparatus for a digital video communications system which is operable operating in a frame transmit mode or a frame discard mode depending on a rate of signals being transmitted, wherein a coding apparatus derives a first motion vector from a current input frame and a previous frame and a second motion vector from frames spaced apart by an intermediate frame, which is discarded during said frame discard mode, and generates an interframe predicted error signal containing an initial frame followed by a differential signal which is representative of the difference between the current frame and a motion-compensated, previous frame during said frame transmit mode and is representative of zero difference during said frame discard mode, wherein said first and second motion vectors and said error signal are transmitted through a transmission medium and received by the decoding apparatus said decoding apparatus comprising:
   a decoding circuit for recovering original frames from the received predicted error signal and the received first and second motion vectors;
   variable delay means coupled to said decoding circuit;
   means for down-scaling the received second motion vector;
   decision means for making a first or second decision if the received second motion vector is valid or invalid, respectively, for motion compensation to be effected during said frame discard mode; and
   means for causing said variable delay means to introduce no delays to frames recovered by said decoding circuit during said frame transmit mode, and responsive to said first decision for causing said variable delay means to introduce a delay corresponding to the down-scaled second motion vector to a frame recovered by said decoding circuit during said frame discard mode, and responsive to said second decision for causing said variable delay means to introduce no delay to the frame recovered during said frame discard mode.

7. A decoding apparatus as claimed in claim 6, wherein said down-scaling means halves horizontal and vertical components of the received second motion vector.

8. A decoding apparatus as claimed in claim 6, wherein said decision means makes said first decision if the predicted error signal which is received immediately following a discarded frame is below a prescribed threshold or said second decision if said signal is above said threshold.

9. A decoding apparatus as claimed in claim 8, wherein said decision means calculates absolute values of the predicted error signal of a frame period following said discarded frame and gives a sum of said absolute values, and makes said first decision if said sum is below said threshold or said second decision if said sum is above said threshold.

10. A decoding apparatus as claimed in claim 6, further comprising a spatial lowpass filter means for lowpass-filtering said current frames before being applied to said motion vector detector.

11. A digital video communications system which is operable in a frame transmit mode or a frame discard mode depending on a rate of signals being transmitted, comprising:
- a first motion vector detector for providing block matching between successive input frames with a smaller block size during said frame transmit mode and producing a first motion vector;
- a second motion vector detector for providing block matching between successive input frames with a larger block size during said frame discard mode and producing a second motion vector;
- a coding circuit for locally recovering a previous input frame during said frame transmit mode, repeating the recovered frame during said frame discard mode, motion-compensating for the locally recovered frame with said first motion vector, and generating an interframe predicted error signal containing an initial frame followed by a differential signal which is representative of the difference between said current input frame and said motion-compensated frame during said frame transmit mode and is representative of a zero difference during said frame discard mode;
- transmit means for transmitting said predicted error signal and said first and second motion vectors signal through a transmission medium;
- receive means for receiving said predicted error signal and said first and second motion vectors through said transmission medium;
- a decoding circuit for recovering original frames from the received predicted error signal and the received first motion vector;
- variable delay means coupled to said decoding circuit; and
- means for causing said variable delay means to introduce no delays to frames recovered by said decoding circuit during said frame transmit mode and for causing said variable delay means to introduce a delay corresponding to the received second motion vector to a frame recovered by said decoding circuit during said frame discard mode.

12. A digital video communications system as claimed in claim 11, further comprising spatial lowpass filter means for lowpass-filtering said current frames before being applied to said first and second motion vector detectors.

13. A coding apparatus for a digital video communications system which is operable in a frame transmit mode or a frame discard mode depending on a rate of signals being transmitted, comprising:
- a first motion vector detector for providing block matching between successive input frames with a smaller block size during said frame transmit mode and producing a first motion vector;
- a second motion vector detector for providing block matching between successive input frames with a larger block size during said frame discard mode and producing a second motion vector;
- a coding circuit for locally recovering a previous input frame during said frame transmit mode, repeating the recovered frame during said frame discard mode, motion-compensating for the locally recovered frame with said first motion vector, and generating an interframe predicted error signal containing an initial frame followed by a differential signal which is representative of the difference between said current input frame and said motion-compensated frame during said frame transmit mode and is representative of a zero difference during said frame discard mode; and
- transmit means for transmitting said predicted error signal and said first and second motion vectors through a transmission medium.

14. A digital video communications system as claimed in claim 13, further comprising spatial lowpass filter means for lowpass-filtering said current frames before being applied to said first and second motion vector detectors.

15. A method for use in a digital video communications system which operates in a frame transmit mode or a frame discard mode depending on a rate of signals being transmitted, comprising the steps of;
- a) deriving a first motion vector from a current input frame and a previous frame and a second motion vector from frames spaced apart by an intermediate frame which is discarded;
- b) locally recovering a previous input frame during said frame transmit mode, repeating the recovered frame during said frame discard mode, motion-compensating for the locally recovered frame with said first and second motion vectors, and generating an interframe predicted error signal containing an initial frame followed by a differential signal which is representative of the difference between said current input frame and said motion-compensated frame during said frame transmit mode and is representative of a zero difference during said frame discard mode;
- c) transmitting said predicted error signal and said first and second motion vectors through a transmission medium;
- d) receiving said predicted error signal and said first and second motion vectors through said transmission medium;
- e) recovering original frames from the received predicted error signal and the received first and second motion vectors;
- f) down-scaling the received second motion vector;
- g) making a first or second decision if the received second motion vector is valid or invalid, respectively, for motion compensation to be effected during said frame discard mode; and
- h) introducing a delay corresponding to the downscaled motion vector to the frame which is recovered by the step (e) during said frame discard mode if said first decision is made by the step (g), introducing no delays to the last-mentioned frame if said second decision is made, and introducing no delays to frames which are recovered by the step (e) during said frame transmit mode.

16. A method as claimed in claim 15, wherein the step (g) halves horizontal and vertical components of the received second motion vector.

17. A method as claimed in claim 15, wherein the step (h) makes said first decision if the predicted error signal which is received immediately following a discarded frame is below a prescribed threshold or said second decision if said signal is above said threshold.

18. A method as claimed in claim 17, wherein the step (h) calculates absolute values of the predicted error signal of a frame period following said discarded frame and gives a sum of said absolute values and compares the sum against said threshold for making said first decision if said sum is below said threshold or making said second decision if said sum is above said threshold.

19. A method as claimed in claim 15, further comprising the step of lowpass-filtering said input frames in a spatial domain prior to the step (a).

20. A decoding method for use in the receive end of a digital video communications system operating in a frame transmit mode or a frame discard mode depending on a rate of signals being transmitted, wherein the transmit end of the system derives a first motion vector from a current input frame and a previous frame and a second motion vector from frames spaced apart by an intermediate frame which is discarded during said frame discard mode, and generates an interframe predicted error signal containing an initial frame followed by a differential signal which is representative of the difference between the current frame and a motion-compensated, previous frame during said frame transmit mode and is representative of zero difference during said frame discard mode, wherein said first and second motion vectors and said error signal are transmitted through a transmission medium and received by the receive end, wherein said first and second motion vectors and said error signal are transmitted through a transmission medium and received by said receive end, comprising the steps of:
 a) recovering original frames from the received interframe predicted error signal and the received first and second motion vectors;
 b) down-scaling the received second motion vector;
 c) making a first or second decision if the received second motion vector is valid or invalid, respectively, for motion compensation to be effected during said frame discard mode; and
 d) introducing a delay corresponding to the down-scaled motion vector to a frame which is recovered by the step (a) during said frame discard mode if said first decision is made by the step (c), introducing no delays to the last-mentioned frame if said second decision is made, and introducing no delays to a frame which is recovered by the step (a) during said frame transmit mode.

21. A decoding method as claimed in claim 20, wherein the step (b) halves horizontal and vertical components of the received second motion vector.

22. A decoding method as claimed in claim 20, wherein the step (c) makes said first decision if the predicted error signal which is received immediately following a discarded frame is below a prescribed threshold and makes said second decision if said signal is above said threshold.

23. A decoding method as claimed in claim 22, wherein the step (c) calculates absolute values of the predicted error signal of a frame period following said discarded frame and gives a sum of said absolute values, and wherein said first decision is made if said sum is below said threshold and said second decision is made if said sum is above said threshold.

24. A coding and decoding method for use in a video communications system operating in a frame transmit mode or a frame discard mode depending on a rate of signals being transmitted, comprising the steps of:
 a) providing block matching between successive input frames with a smaller block size during said frame transmit mode and producing a first motion vector, and providing block matching between successive input frames with a larger block size during said frame discard mode and producing a second motion vector;
 b) delaying said input frames for one frame period, providing motion compensation on the delayed frame with said first motion vector and producing an interframe predicted error signal containing an initial frame followed by a differential signal which is representative of a difference between each of said input frames and the motion-compensated frame during said frame transmit mode and is representative of zero difference during said frame discard mode;
 c) transmitting said predicted error signal and said first and second motion vectors through a transmission medium;
 d) receiving said predicted error signal and said first and second motion vectors through said transmission medium;
 e) recovering original frames from the received predicted error signal and the received first motion vector; and
 f) introducing no delays to frames recovered by the step (f) during said frame transmit mode and introducing a delay corresponding to the received second motion vector to a frame recovered by the step (f) during said frame discard mode.

25. A method as claimed in claim 24, further comprising the step of lowpass-filtering said input frames in a spatial domain prior to the step (b).

26. A coding method for a video communications system operating in a frame transmit mode or a frame discard mode depending on a rate of signals being transmitted, comprising the steps of:
 a) providing block matching between successive input frames with a smaller block size and producing a first motion vector during said frame transmit mode, and providing block matching between successive input frames with a larger block size and producing a second motion vector during said frame discard mode;
 b) delaying said input frames for one frame period, providing motion compensation on the delayed frame with said first motion vector and producing an interframe predicted error signal containing an initial frame followed by a differential signal which is representative of a difference between each of said input frames and the motion-compensated frame during said frame transmit mode and is representative of zero difference during said frame discard mode; and
 c) transmitting said predicted error signal and said first and second motion vectors through a transmission medium.

27. A method as claimed in claim 26, further comprising the step of lowpass-filtering said input frames in a spatial domain prior to the step (b).

* * * * *